(12) United States Patent
Lee

(10) Patent No.: US 6,828,982 B2
(45) Date of Patent: Dec. 7, 2004

(54) APPARATUS AND METHOD FOR CONVERTING OF PIXELS FROM YUV FORMAT TO RGB FORMAT USING COLOR LOOK-UP TABLES

(75) Inventor: Seung-Cheol Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 41 days.

(21) Appl. No.: 10/284,980

(22) Filed: Oct. 31, 2002

(65) Prior Publication Data

US 2003/0234795 A1 Dec. 25, 2003

(30) Foreign Application Priority Data

Jun. 24, 2002 (KR) ......................................... 2002-35313

(51) Int. Cl.[7] .............................................. G09G 5/04
(52) U.S. Cl. ....................... 345/604; 345/603; 345/593; 345/643; 348/659
(58) Field of Search ............................... 345/604, 431; 395/131

(56) References Cited

U.S. PATENT DOCUMENTS

| | | | | |
|---|---|---|---|---|
| 5,233,684 A | * | 8/1993 | Ulichney | 345/604 |
| 5,920,322 A | * | 7/1999 | Ulichney | 345/604 |
| 5,923,316 A | * | 7/1999 | Kitamura et al. | 345/603 |
| 5,936,683 A | * | 8/1999 | Lin | 348/659 |
| 5,963,263 A | * | 10/1999 | Shyu | 348/453 |
| 6,028,590 A | * | 2/2000 | Wood et al. | 345/604 |
| 6,043,804 A | * | 3/2000 | Greene | 345/601 |
| 6,166,720 A | * | 12/2000 | Sim | 345/604 |
| 6,356,277 B1 | * | 3/2002 | Yajima et al. | 345/603 |
| 6,369,860 B1 | * | 4/2002 | Into | 348/659 |

* cited by examiner

Primary Examiner—Matthew C. Bella
Assistant Examiner—Alysa N Brautigam
(74) Attorney, Agent, or Firm—Dilworth & Barrese LLP

(57) ABSTRACT

Pixels in a YUV format including a Y component representing luminance and U and V components representing chrominance are converted into a RGB format including R, G, and B components respectively representing red, green, and blue colors in order to display images on a video display device such as a CRT (Cathode Ray Tube) or a LCD (Liquid Crystal Display). The present invention relates to an apparatus and a method for converting the pixels from the YUV format to the RGB format using color look-up tables with a small memory capacity. The R component is obtained from the first and second color look-up tables using the Y and V components as indexes, and the G component is obtained from the first, third, and fourth color look-up tables using the Y, U, and V components as indexes, and the B component is obtained from the first and fifth color look-up tables using the Y and U components as indexes.

11 Claims, 9 Drawing Sheets

APPARATUS AND METHOD FOR CONVERTING OF PIXELS FROM YUV FORMAT TO RGB FORMAT USING COLOR LOOK-UP TABLES

PRIORITY

This application claims priority to an application entitled "APPARATUS AND METHOD FOR CONVERTING OF PIXELS FROM YUV TO RGB FORMAT USING COLOR LOOK-UP TABLES", filed in the Korean Industrial Property Office on Jun. 24, 2002 and assigned Serial No. 2002-35313, the contents of which are hereby incorporated by reference.

BACKGROUND OF THE INVENTION

1. Field of the Invention

The present invention relates to a method for processing video signals, and more particularly to an apparatus and a method for converting pixels from a YUV format to a RGB format using color look-up tables with a small memory capacity.

2. Description of the Related Art

Usually, a RGB format and a YUV format are kinds of color modes for representing colors of pixels of an image in visible media. The RGB format is a mode for separating color signals into color components of R (Red), G (Green), and B (Blue) color, i.e., three primary colors of light used when video display devices such as a CRT (Cathode Ray Tube) or a LCD (Liquid Crystal Display) create colors or images. The YUV format is a mode for separating color signals into a luminance component (Y component) representing a brightness, and chrominance components (U and V components) representing color. Herein, the U component represents a blue color, and the Y component represents a red color.

In order to display colors, the RGB format requires at least three color-difference data, thereby needing a large memory capacity. However, since the RGB format employs the same displaying method as that of the video display device, this mode has excellent color-separation and transmission effects. On the other hand, the YUV format has poorer color-separation and transmission effects than the RGB format, but has an advantage in expressing a large number of colors even using a few color data.

Typically, most graphic cards use the YUV format in processing data. Generally, not only a digital video capturing device such as a CCD (Charge-Coupled Device) or a CMOS (Complementary Metal-Oxide Semiconductor) sensor but also a video decoder with a video compression standard such as a MPEG (Moving Picture Experts Group Standards) 1, 2, 4, or H.261, 263, 26L, or etc. uses an output format in the YUV mode. Therefore, in order to display pixels in the YUV format outputted from the camera or the video decoder in a digital video product device on the CRT or the LCD, the pixels must be converted into the RGB format.

This color model conversion from the YUV format to the RGB format is accomplished by equations representing the relationship between the YUV format and the RGB format. In the equations for converting the pixels between the YUV format and the RGB format, different statistical weight values are respectively distributed to the R, G, and B components according to their sensitivities to human vision. Therefore, various equations are applied according to the distribution methods of the statistical weight values. Among the various equations, four or five equations have been often used. One equation is defined as follows.

$$R = 1.164*(Y-16) + 1.596*(V-128)$$
$$G = 1.164*(Y-16) - 0.813*(V-128) - 0.391*(U-128)$$
$$B = 1.164*(Y-16) + 2.018*(U-128) \qquad \text{[Equation 1]}$$

Using the above-described Equation 1, the R, G, and B component values are obtained from hardware-based multipliers and adders. That is, the R and B component values are obtained from two multipliers and one adder, and the G component value is obtained from three multipliers and two adders.

As above-described, the color model conversional operations of Equation 1 are implemented by the hardware. Since the hardware occupies a large space, the hardware is not proper to be employed by a small-sized mobile communication terminal. Further, in multiplication operations of Equation 1, the statistical weight values to the Y, U, and V component values are not integers but decimal fractions with a floating point, thereby complicating the design of the hardware and increasing the size of the hardware chip. Moreover, interfaces between the hardware device for the color model conversion and the camera or video decoder are changed by the kinds of the cameras or video decoders, thereby reducing generalization.

On the other hand, the color model conversional operations of Equation 1 may be implemented by software. However, the statistical weight values to the Y, U, and V component values are also decimal fractions with a floating point, thereby requiring a large number of instructions. These operations impose a heavy burden on a microprocessor of a mobile communication terminal with more limited computing power than a general desktop computer.

MPEG ISO/IEC 13818-2 Section 6.3.6 states a method for converting the statistical weight values of Equation 1 into integers in order to convert a color mode of a mobile communication terminal, as follows.

$$R = 76309*(Y-16) + crv*(V-128) + 32768 >> 16$$
$$G = 76309*(Y-16) - cgu*(U-128) - cgv*(V-128) + 32768 >> 16$$
$$B = 76309*(Y-16) + cbu*(U-128) + 32768 >> 16 \qquad \text{[Equation 2]}$$

Herein, crv, cgu, cgv, and cbu are statistical weight values differently given by respective International Standard Organizations. These values are described in the following Table 1.

TABLE 1

| International Standard Organization | crv | cbu | cgu | cgv |
|---|---|---|---|---|
| No sequence display extension | 117504 | 138453 | 13954 | 34903 |
| ITU-R Rec.709(1990) | 117504 | 138453 | 13954 | 34903 |
| Unspecified | 104597 | 132201 | 25675 | 53279 |
| Reserved | 104597 | 132201 | 25675 | 53279 |
| FCC | 104448 | 132798 | 24759 | 53109 |
| ITU-R Rec.624-4 System B, G | 104597 | 132201 | 25675 | 53279 |
| SMPTE 170M | 104597 | 132201 | 25675 | 53279 |
| SMPTE 240M(1987) | 117579 | 136230 | 16907 | 35559 |

As above-described, in Equation 2, the statistical weight values applied to the Y, U, and V component values are integers. Further, since shift operations requiring instructions with a smaller number than the multiplication operations are used, the number of the instructions required in Equation 2 is much smaller than Equation 1.

However, most of microprocessors perform multiplication operations slower than addition or subtraction operations. Further, most of microprocessors perform a table access operations faster than multiplication operations. Moreover, in case an apparatus for converting the color mode is implemented as the above-described hardware, an interface method between a video CODEC for decoding a compressed image and generating Y, U, and V component values and a video display device must be fixed. Thus, when a type of the video CODEC to be used is changed or upgraded, the interface must be amended. Therefore, it is preferable to use color look-up tables instead of multipliers. Many conventional methods for converting a color mode using color look-up tables are known by several documents, e.g., U.S. Pat. No. 5,936,683.

In using the color look-up tables, a necessary memory capacity is determined by the size of the color look-up table. The size of the color look-up table is changed by the number of variables used as indexes. For example, U.S. Pat. No. 5,936,683 discloses color look-up tables using two variables as indexes. In order to use two variables as indexes, since a color look-up table must represent all combinational cases of two variables, the size of the color look-up table becomes larger than that of a color look-up table using one variable as an index. Therefore, it requires that the size of the color look-up table must be reduced by decreasing the number of variables used as indexes.

As the number of color look-up tables increases, a larger memory capacity for storing the color look-up tables is required. Therefore, in order to reduce the memory capacity, it is necessary to decrease the number of the color look-up tables. In the case of Equation 2, if one color look-up table is used for each conversional formula used, the color model conversion can be accomplished by only three color look-up tables. However, in this case, the color look-up tables use two or three variables as indexes, thereby considerably increasing the sizes of the color look-up tables. Therefore, in order to accomplish the color model conversion with the minimum memory capacity, it is necessary to properly adjust the numbers and the sizes of the color look-up tables.

SUMMARY OF THE INVENTION

Therefore, the present invention has been made in view of the above problems, and it is an object of the present invention to provide an apparatus and a method for converting pixels from a YUV format to RGB format using color look-up tables.

It is another object of the present invention to provide an apparatus and a method for converting a color mode by reducing the sizes and numbers of look-up tables with a small memory capacity.

In accordance with one aspect of the present invention, the above and other objects can be accomplished by the provision of an apparatus for converting a color mode using at least five look-up tables respectively using one index and at least three adders.

In accordance with another aspect of the present invention, there is provided to in a system for converting pixels from a YUV format including a Y component representing luminance and U and V components representing chrominance to a RGB format including R, G, and B components respectively representing red, green, and blue colors using color look-up tables in order to display images on a video display device, a method for generating pixels in the YUV format including the Y, U, and V components from encoded video signals, obtaining the R component value from respective partial values of the Y and V components to the R component, obtaining the G component value from respective partial values of the Y, U, and V components to the G component, and obtaining the B component value from respective partial values of the Y and U components to the B component. The method comprises the steps of: inputting a Y component value of the generated pixel to a first color look-up table, selecting the partial values of the Y component to the R, G, B components from the first color look-up table corresponding to the inputted Y component value, and respectively outputting the selected partial values to first, second, and third adders; inputting a V component value of the generated pixel to second and third color look-up tables, respectively selecting the partial values of the V component to the R and G components from the second and third color look-up tables corresponding to the inputted V component value, and respectively outputting the selected partial values to the first and second adders; inputting a U component value of the generated pixel to fourth and fifth color look-up tables, respectively selecting the partial values of the U component to the G and B component from the fourth and fifth color look-up tables corresponding to the inputted U component value, and respectively outputting the selected partial values to the second and third adders; and obtaining R, G, and B component values from added values of the partial values using the first, second, and third adders.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
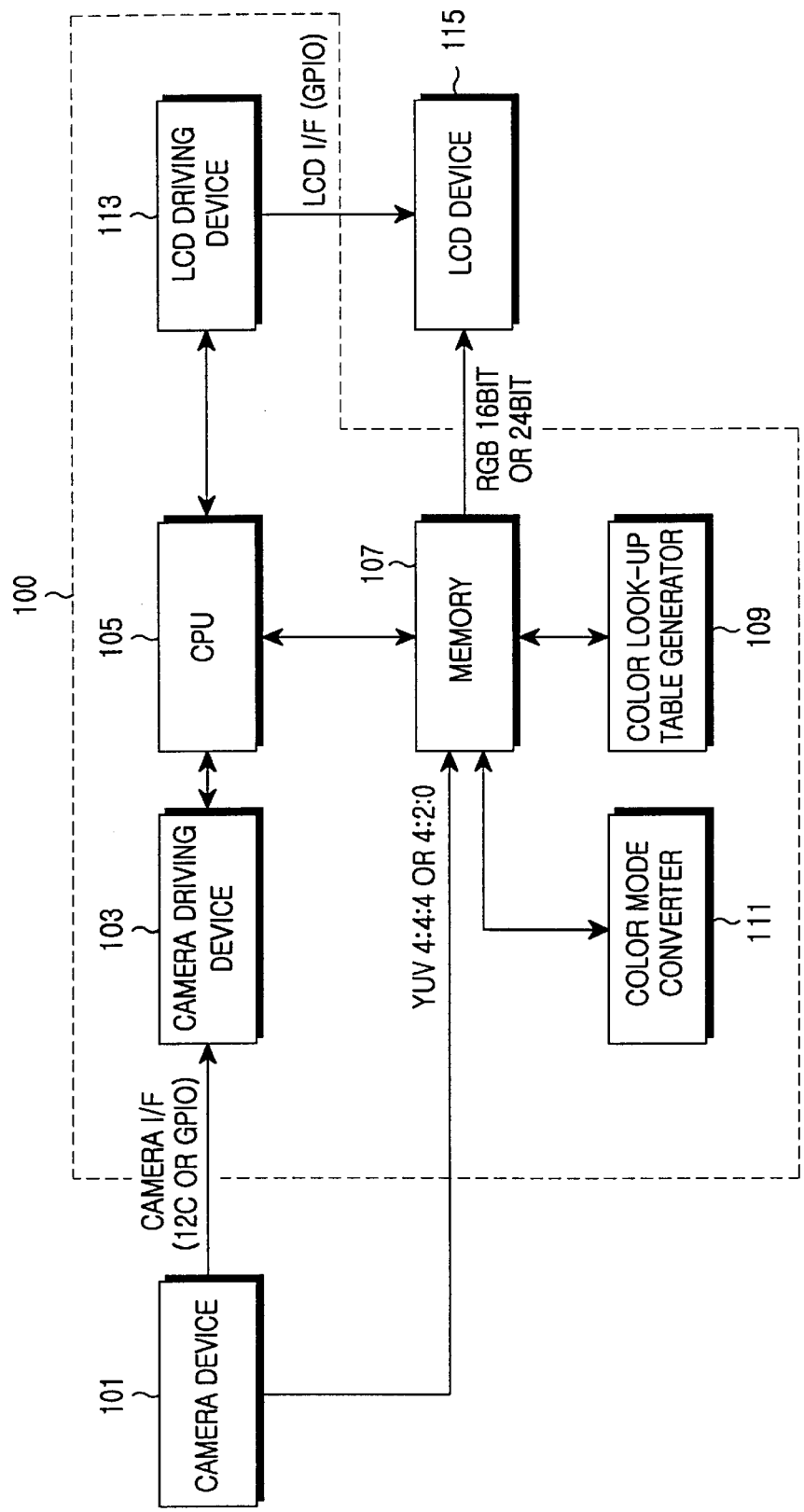
FIG. 1 is a block diagram of a multimedia system for displaying video signals from a camera on a LCD in accordance with an embodiment of the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may obscure the subject matter of the present invention.

FIG. 1 is a block diagram of a multimedia system for displaying video signals from an external video signal source such as a digital camera on a LCD in accordance with an embodiment of the present invention. The multimedia system comprises a camera device 101, an LCD device 115, and a multimedia device 100. The multimedia device 100 comprises a camera driving device 103, a CPU (Central Processing Unit) 105, a memory 107, a color look-up table generator 109, a color mode converter 111, and a LCD driving device 113. In order to reduce the size of the multimedia system, the multimedia device 100 may be produced as a multimedia chip in a SOC (System On Chip) type.

The multimedia system uses the camera device 101 as a video signal source for providing video signals from the exterior. However, a CD-ROM (Compact Disk Read-Only Memory) or video data outputted from a video camera may be used as the external video signal source. The camera device 101 is connected to the camera driving device 103 via a communication unit such as a GPI/O (General Purpose Input/Output) or a 12C, and transmits its video signals to the memory 107 via a bus.

The camera driving device 103 serves as an interface between the CPU 105 and the camera device 101. That is, the camera driving device 103 serves to convert input/output instructions from the CPU 105, for example, an instruction to copy the video signals from the camera 101 into the memory 107 or an interrupt signal for copy termination, into comprehensible messages by the camera device 101 and the CPU 105.

Herein, the CPU 105 is a microprocessor such as ARM9 Core. The CPU 105 controls the over-all operation of the multimedia system. Specifically, the CPU 105 copies video data in a YUV format from the camera device 101 into the memory 107 by the camera driving device 103 via the bus. After completing the copy, when the copy termination interrupt signal is inputted from the camera driving device 103 to the CPU 105, the CPU 105 converts the video data into a RGB format using the color look-up table generator 109 and the color mode converter 111, and then displays the converted video data on the LCD device 15 via the LCD driving device 113.

The memory 107 stores pixel data in the YUV format inputted from the camera device 101 and pixel data in the RGB format inputted from the color mode converter 111 in its designated regions. The color look-up tables generated by the color look-up table generator 109 are also stored in the memory 107. Usually, a SDRAM (Synchronous Dynamic Random Access Memory) is used as the memory 107.

The color look-up table generator 109 stores programs and data for generating the color look-up tables. The CPU 105 controls the color look-up table generator 109, thereby allowing the color look-up table generator 109 to generate each color look-up table respectively to Y, U and V component values in a designated range. Further, under control of the CPU 105, the generated color look-up tables are stored in designated regions of the memory 107 or in other memories (not shown).

Under the control of the CPU 105, the color mode converter 111 converts the pixel data in the YUV format into the pixel data in the RGB format with reference to the generated color look-up tables. The color mode converter 111 reads the Y, U and V component values stored in the memory 107, and then obtains R, G and B component values respectively corresponding to the read Y, U and V component values from the color look-up tables. Then, the obtained R, G and B component values are stored in designated regions of the memory 107.

The LCD driving device 113 drives and controls the LCD device 115 so as to output the R, G and B component values of each pixel converted by the color mode converter 11 and stored in the memory 107 on the LCD device 115.

In above-described preferred embodiment of the present invention, the multimedia system comprises the color mode converter 111. However, those skilled in the art will appreciate that the CPU 105 can function as the color mode converter using its operation unit.

Figure 2:
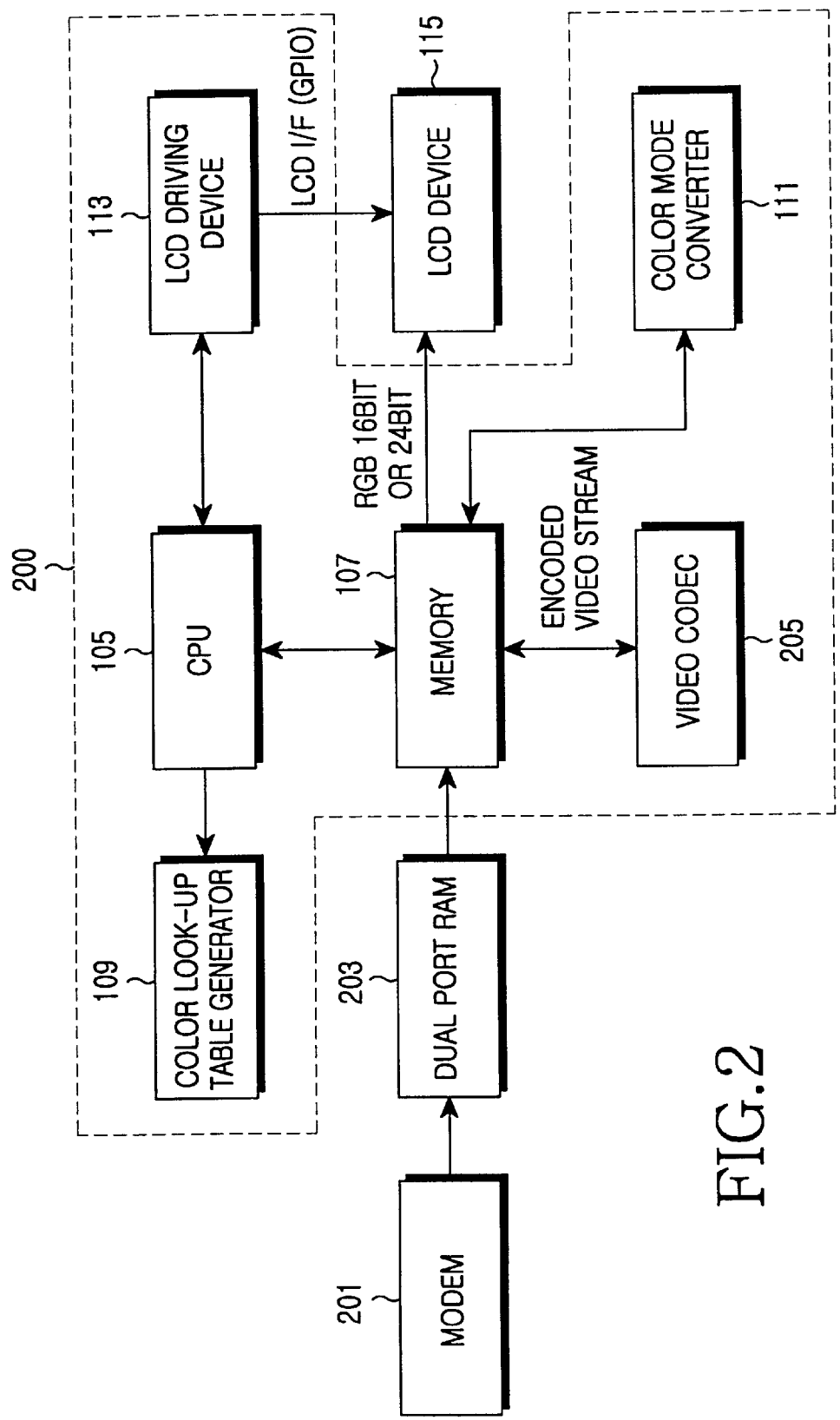
FIG. 2 is a block diagram of a multimedia system for decoding MPEG video data transmitted from a modem via a video CODEC and then displaying the decoded video signals on a LCD in accordance with an embodiment of the present invention.

FIG. 2 is a block diagram of a multimedia system for receiving compressed video data via a modem, for example compressed video data in a MPEG 4 or H.263 format, and outputting the received data to the video display device such as the LCD. The multimedia system comprises a modem 201 for communicating the video data, a dual port RAM 203, the LCD device 115, and a multimedia device 200. Herein, the multimedia device 200 of FIG. 2 is similar to the multimedia device 100 of FIG. 1 in that the multimedia device 200 comprises the CPU 105, the memory 107, the color look-up table generator 109, the color mode converter 111, and the LCD driving device 113. However, the multimedia device 200 further comprises a video CODEC (coder-decoder) 205. The multimedia device 200 may be also produced as a multimedia chip in a SOC (System On Chip) type.

The modem 201 serves to demodulate digital signals for a computer system into analog signals for wire and/or radio communications and to modulate the analog signals into the digital signals. In case of a CDMA (Code Division Multiple Access) mobile communication terminal, MSM (Mobile Station Modem) chips of QUALCOMM Inc. are generally used as the modem 201. The modem 201 receives video data via a wire or radio communication, and stores the received data in the dual port RAM 203.

The dual port RAM 203 is a memory for storing the video data. The dual port RAM 203 comprises two separate pins, i.e., one pin for reading data and another pin for writing data. Therefore, while new video data from the modem 201 is written on the dual port RAM 203, in order to reproduce the existing stored video data, the CPU 105 can read the existing stored video data from the dual port RAM 203 and copy the read data into the memory 107.

The video CODEC 205 decodes encoded video data inputted from the memory 107 into video signals in the YUV format, and stores the decoded video signals in the YUV format in the memory 107. However, the video signals in the YUV format may be stored in an inner memory (not shown) of the video CODEC 205. After completing the decoding of the video data, the video CODEC 205 requests the CPU 105 to start the color model conversion. The constructions and operations of other components of the multimedia device 200 of FIG. 2 are substantially the same as those of the multimedia device 100 of FIG. 1, and their detailed descriptions will thus be omitted.

In a computer system with the above-described constructions of FIGS. 1 and 2, a method for converting pixels from the YUV format into the RGB format is described in detail hereinafter with reference to FIGS. 3 to 7.

First, the above-described Equation 2 is converted into Equation 3 as follows.

$$R=[76309*(Y-16)]+[crv*(V-128)+32768]>>16$$

$$G=[76309*(Y-16)]+[32768-cgu*(U-128)]+[cgv*(128-V)]>>16$$

$$B=[76309*(Y-16)]+[cbu*(U-128)+32768]>>16 \quad \text{[Equation 3]}$$

Herein, $16 \leq Y \leq 235$, $16 \leq U \leq 240$, and $16 \leq V \leq 240$.

Each of the above three formula of Equation 3 comprises the total sum of partial values, each comprising one variable selected from three variables, i.e., the Y, U, and V component values, and a shifting operation. According to the Equation 3, the R component value comprises two partial values. The first part is $76309*(Y-16)$ in which the Y component operates, and the second part is $crv*(V-128)+32768$ in which the V component operates on the R component.

The G component value comprises three partial values. The first part is also $76309*(Y-16)$ in which the Y component operates. The second part is $32768-cgu*(U-128)$ in which the U component operates on the G component, and the third part is $cgv*(128-V)$ in which the V component operates on the G component. Further, the B component value comprises two partial values. The first part is also $76309*(Y-16)$ in which the Y component operates, and the second part is $cbu*(U-128)+32768$ in which the U component operates on the B component.

Each partial value is obtained from the corresponding single color look-up table. The Y, U, and V components are used as indexes or memory addresses into the color look-up tables. Each color look-up table to the corresponding partial value uses only one variable as an index or a memory address. Therefore, compared to the conventional color look-up table using two or three variables as indexes, the color look-up table of the present invention requires much less memory capacity. Further, a statistical weight value to at least one variable, i.e., the statistical weight value to the Y component, is fixed. Therefore, one color look-up table for the Y component is commonly used in the three formulas of Equation 3, thereby reducing the number of the necessary color look-up tables.

Figure 3:
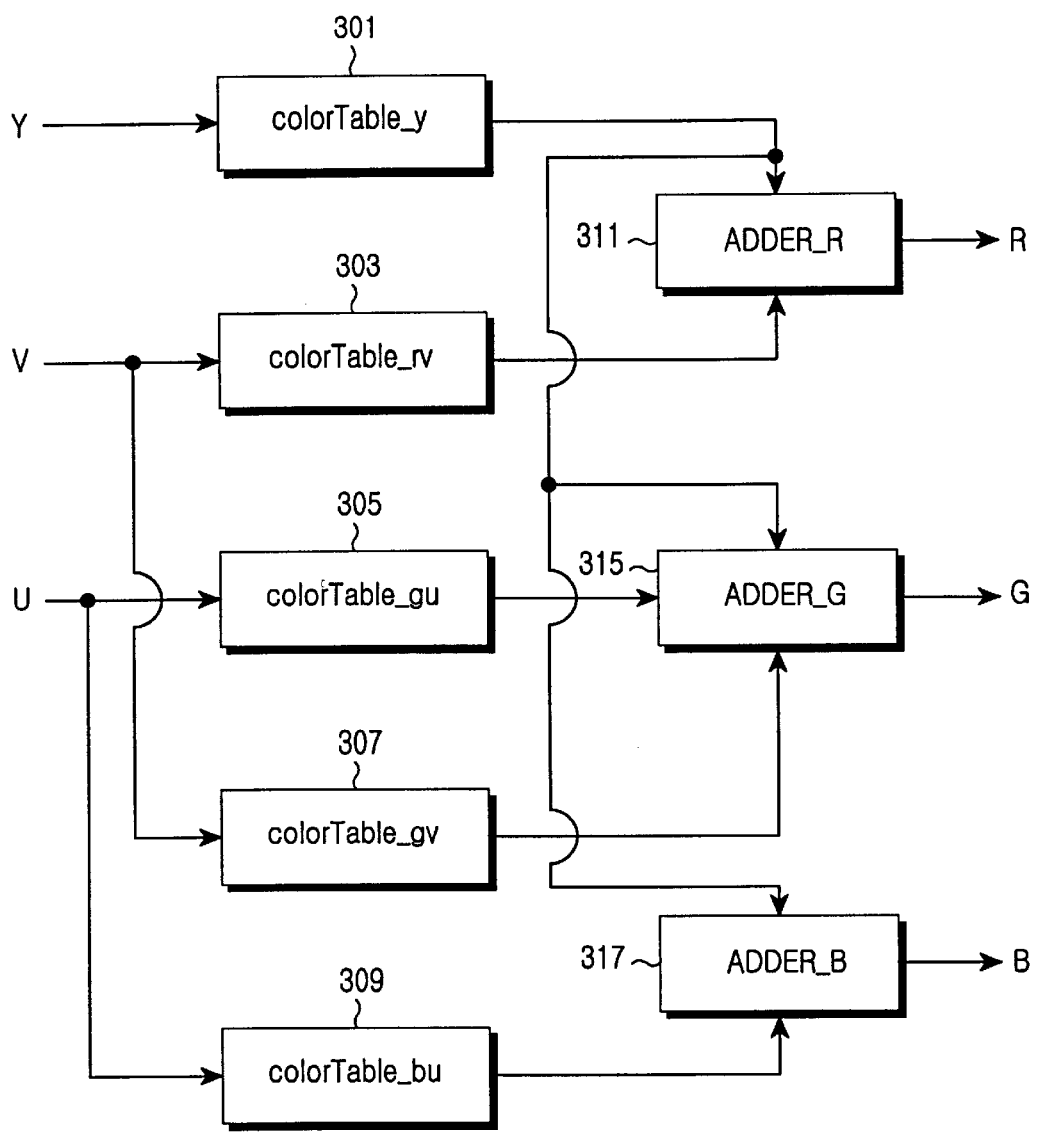
FIG. 3 is a block diagram of an apparatus for converting a color mode in accordance with an embodiment of the present invention.

FIG. 3 is a block diagram of the color mode converter 111 for converting a pixel data from the YUV format to the RGB format using five color look-up tables and three adders, with reference to the above-described Equation 3.

Herein, a color look-up table colorTable_y 301 is a conversion table for the Y component, and stores calculated values of $76309*(Y-16)$ for all the Y component values in the range of 16 to 235. The color mode converter 111 reads a Y component value desired to be converted from the memory 107, and using the read Y component value as an address then outputs the stored value in this address of the color look-up table colorTable_y 301, i.e., the value of $76309*(Y-16)$, to an adder_R 311, adder_G 315, and adder_B 317.

The V component value is used as an index of a color look-up table colorTable_rv 303 and a color look-up table colorTable_gv 307. The color look-up table colorTable_rv 303 is a table for obtaining the partial value of the R component from the V component value, and stores calculated values of $crv*(V-128)+32768$ for all the V component values in the range of 16 to 240. The color look-up table colorTable_gv 307 is a table for obtaining the partial value of the G component from the V component, and stores calculated values of $cgv*(128-V)$ for all the V component values in the range of 16 to 240. When a V component value desired to be converted is inputted, each color look-up table 303 or 307 outputs the stored value to an adder_R 311 or an adder_G 315 using each inputted V component value as an index.

A color look-up table colorTable_gu 305 and a color look-up table colorTable_bu 309 are respectively tables for obtaining partial values of the G and B components from the U component value. The color look-up tables 305 and 309 respectively store calculated values of $32768-cgu*(U-128)$ and $cbu*(U-128)+32768$ for all the U component values in the range of 16 to 240, and then output the stored values corresponding to inputted U component values to the adder_G 315 and an adder_B 317.

The adder_R 311 adds the respective values inputted from the color look-up table colorTable_y 301 and the color look-up table colorTable_rv 303, and then outputs the sum of these values to a shift operator (not shown). The shift operator shift-operates the inputted value from the adder R 311, and stores its resulting value as a R component value of the corresponding pixel in the memory 107. The adder_G 315 adds the inputted values from the color look-up table colorTable_y 301, the color look-up table colorTable_gu 305, and the color look-up table colorTable_gv 307, shift-operates the sum, and stores its resulting value as a G component value in the memory 107. A B component value is generated by adding the inputted values from the color look-up table colorTable_y 301 and the color look-up table_bu 309 by the adder_B 317, shift operating the sum. Then, the resulting value is stored as the B component value in the memory 107.

Although the color mode converter 111 of this embodiment of the present invention comprises the above-described adders, addition operations performed by the adders may be accomplished by an operation device of the CPU 105. Further, the color mode converter 111 may only store a program for converting pixels from the YUV format to the RGB format, and the CPU 105 may operate the program.

Figure 4:
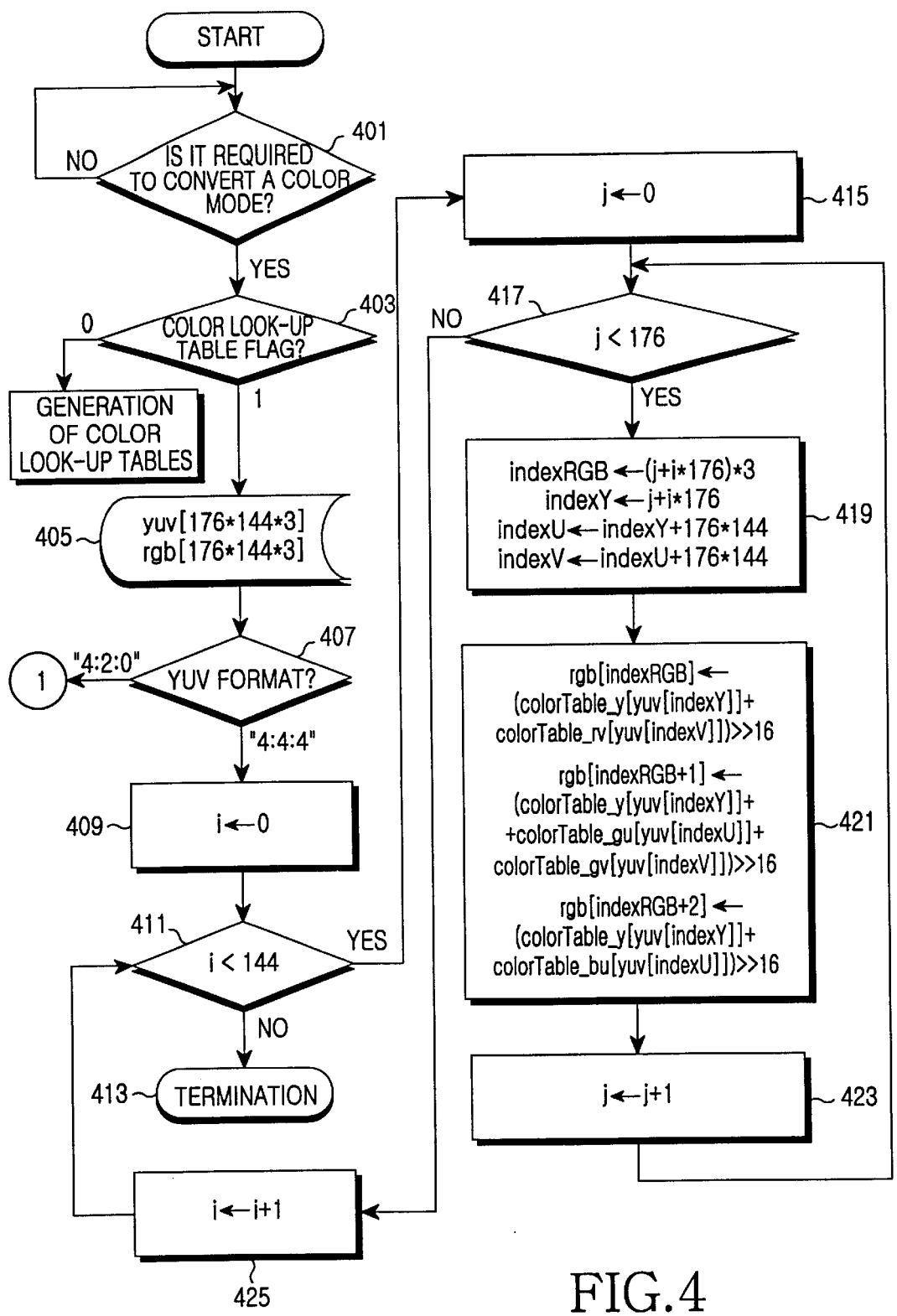
FIG. 4 is a block diagram of a process for converting a YUV-to-RGB color mode in accordance with an embodiment of the present invention.
Figure 5:
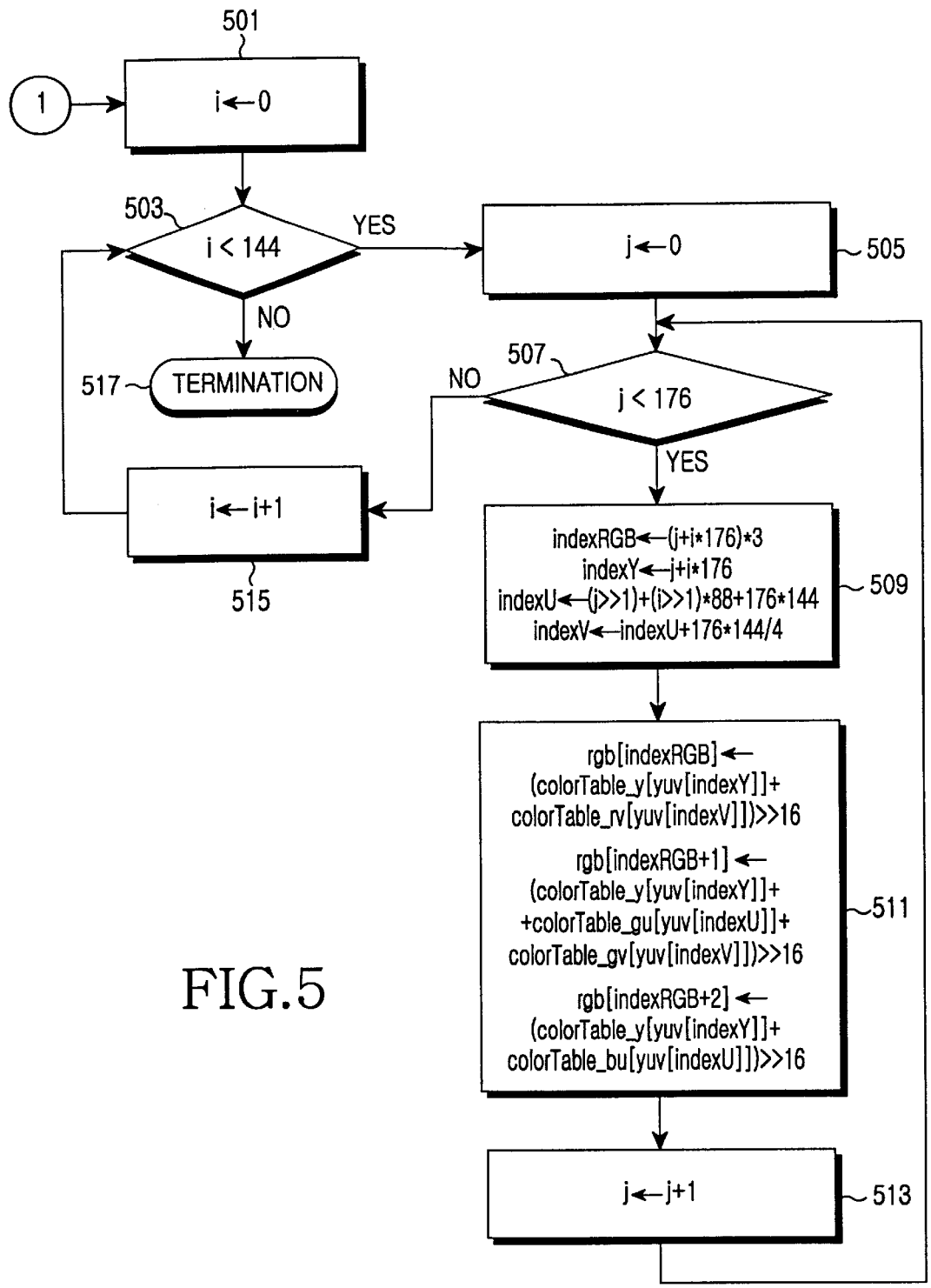
FIG. 5 is a block diagram of a process for converting a YUV-to-RGB color mode in accordance with another embodiment of the present invention.

FIGS. 4 and 5 is a flow chart showing a method for converting one frame from the YUV format to the RGB format using the color mode converter 111 of FIG. 3 in accordance with an embodiment of the present invention. The present invention may be applied to all the video formats such as a CIF (Common Intermediate Format), a QCIF (Quarter CIF), and SQCIF (Sub Quarter CIF), etc. However, it is assumed that the present invention is applied to the QCIF mode with the number of pixels of 176×144 per frame.

At step 401, the CPU 105 verifies whether the color model conversion is required or not. That is, the CPU 105 verifies whether a signal requiring the conversion of color mode is inputted from the video CODEC 205 or a copy termination interrupt signal is inputted from the LCD driving device 103.

If the color model conversion is not required at step 401, the process returns to START. In case the color model conversion is required at step 401, the CPU 105 examines at step 403 whether a color look-up table flag is set or not. The color look-up table flag serves to represent whether the color look-up tables are generated or not. When the color look-up tables have been generated, the color look-up table flag is set to be 1. Herein, the color look-up table flag is used as a global variable, which assigns one bit on the memory 107 or a register (not shown) and is generally used throughout the program. When the color look-up tables have not been generated at step 403, that is, the color look-up table flag is set to be 0, the method is directed to a routine for generating the color look-up tables of FIG. 8. However, when the color look-up tables have been generated, the method is directed to step 405. That is, the CPU 105 starts the YUV-to-RGB conversion using the color mode converter 111.

At step 405, the CPU 105 again stores the Y, U, and V component values already stored in designated regions of the memory 107 in a yuv arrangement of 176×144×3, and assigns rgb[176×144×3] arrangement regions for storing the R, G, and B component values converted from the Y, U, and V component values on the memory 107. Then, step 407 is carried out. Herein, the number of 176 means the number of pixels arranged in a horizontal direction per frame, and the number of 144 means the number of pixels arranged in a vertical direction per frame. The number of 3 means that three component values such as the Y, U, and V components or the R, G, and B components are defined per pixel. However, in case that the video format is the CIF mode or the SQCIF mode, it may be appreciated that the memory is assigned according to the corresponding number of pixels. Other storage techniques are of course available provided that the underlying procedures are followed.

Figure 6A:
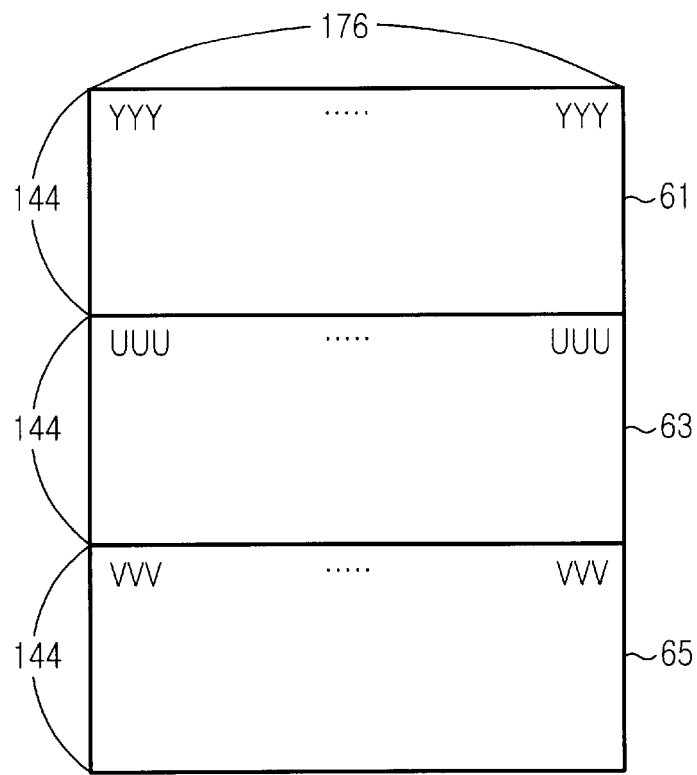
FIG. 6A shows a memory map for storing YUV pixel data in accordance with an embodiment of the present invention.
Figure 6B:
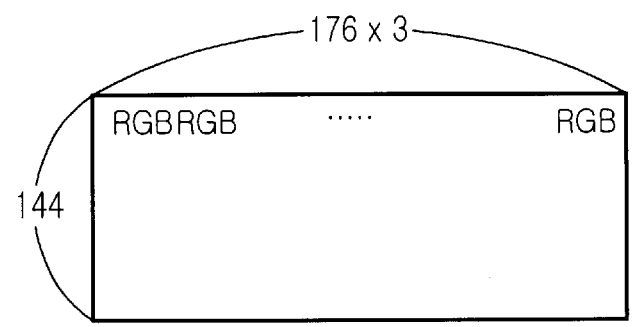
FIG. 6B shows a memory map for storing RGB pixel data in accordance with an embodiment of the present invention.

A memory map for storing the YUV arrangement and the RGB arrangement is shown in FIG. 6. In this embodiment of the present invention, as shown in FIG. 6a, the Y, U, and V component values of each pixel are separately stored in designated regions 61, 63, and 65 of 176×144, and as shown in FIG. 6b, the R, G, and B component values of each pixel are successively stored in the memory. However, the present invention may use a reverse situation to the above two cases or either one of two cases.

Returning to FIG. 4, the CPU 105 at step 407 tests the YUV data format. Although the present invention may be applied to any ratio of Y:U:V, a case of Y:U:V=4:4:4 and a case of Y:U:V=4:2:0 are described in detail. However, those skilled in the art will appreciate that the present invention also applies to a case of Y:U:V=4:2:2 or a case of Y:U:V=4:1:1.

In case that the Y component being a luminance component and the U and V components being chrominance components are equal in importance, i.e., the ratio of Y:U:V=4:4:4, the process is directed to step 409. On the other hand, in case that the luminance component is more important than the chrominance components, i.e., the ratio of Y:U:V=4:2:0, the process is directed to step 501.

First, a case of Y:U:V=4:4:4 is described in detail with reference to steps 409 to 425. At step 409, the CPU 105 sets a value of "i" to be "0" and the process is directed to step 411. Herein, the character "i" is a variable for counting pixels arranged in the vertical direction per frame, and has values in the range of 0 to 144 in the QCIF mode. At step 411, the CPU 105 compares the value of "i" to 144. When the value of "i" is smaller than 144, step 415 is carried out, and when the value of "i" is 144, step 413 is carried out and the process is terminated.

At step 415, the CPU 105 sets a value of "j" to be "0". Herein, the character "j" is a variable for counting pixels arranged in the horizontal direction per frame, and has values in the range of 0 to 176 in the QCIF mode. At step 417, the CPU 105 compares the value of "j" to 176. When the value of "j" is smaller than 176, step 419 is carried out.

Step 419 is a step for setting indexes in the RGB arrangement and the YUV arrangement. An indexRGB is an index in the RGB arrangement to store the R, G, and B component values. As shown in FIG. 6b, since the R, G, and B component values are successively arranged and stored, the indexRGB is set to be (j+i×176)×3. On the other hand, an indexY, an indexU, and an indexV are indexes in the YUV arrangement. The indexY is set to be j+i×176 and indicates an address in the region 61 of FIG. 6a. Further, the indexU is set to be indexY+176×44 and indicates an address in the region 63 of FIG. 6a, and the indexV is set to be indexU+176×144 and indicates an address in the region 65 of FIG. 6a. Since the values of both "i" and "j" are set to be "0", the indexY is 0, the indexU is 176×144, and the indexV is 2×176×144, thereby respectively indicating each first address of the regions 61, 63, and 65 of FIG. 6a. Further, the indexRGB indicates the first address of the RGB arrangement of FIG. 6b. After the indexes are set, the process continues to step 421.

At step 421, the CPU 105 outputs values stored in each address of the indexY, indexU, and indexV in the YUV arrangement of the memory 107 to the color mode converter 111. That is, yuv[indexY] represents the Y component value stored in the indexY address, yuv[indexU] represents the U component value stored in the indexU address, and yuv[indexV] represents the V component value stored in the index V address. As described above, since the values of "i" and "j" are set to be "0", the indexY is 0, the index U is 176×144, and the indexV is 2×176×144, values stored in the respective first addresses in the yuv arrangement, i.e., the corresponding Y, U, and V component values of the first pixel, are outputted from the memory 107 to the color mode converter 111. The color mode converter 111 converts the Y, U, and V component values of the first pixel inputted from the CPU 105 into R, G, and B component values by the method of FIG. 3. The Y component value of the first pixel, i.e., the yuv[indexY], and the V component value of the first pixel, i.e., the yuv[indexV], are respectively inputted to the color look-up table colorTable_y 301 and the color look-up table colorTable_rv 303, and the values stored in the corresponding addresses of the color look-up table colorTable_y 301 and the color look-up table colorTable_rv 311 are outputted to the adder_R 311 as partial values of the R component value. The adder_R 311 adds two partial values, shifts their result value, and then stores the shifted value as the R component value in the rgb[indexRGB]. Further, the color mode converter 111 outputs a value stored in the color look-up table colorTable_y 301 corresponding to the inputted Y component value of the first pixel from the CPU 105, a value stored in the color look-up table colorTable_gu 305 corresponding to the inputted U component value from the CPU 105, and a value stored in the color look-up table colorTable_gv 307 corresponding to the inputted V component value from the CPU 105 to the adder_G 315 as partial values of the G component value. Then, the adder_G 315 adds three partial values, shifts their result value, and stores the shifted value as the G component in the rgb[indexRGB+1]. The color mode converter 111 outputs a value stored in the color look-up table colorTable_y 301 corresponding to the Y component value of the first pixel and a value stored in the color look-up table colorTable_bu 309 corresponding to the U component value of the first pixel to the adder_B 317 as partial values of the B component value. Then, the adder_B 317 adds two partial values, shifts their result value, and stores the shifted value as the B component value in rgb[indexRGB+2] of the memory 107. Since the indexRGB is 0, the obtained R, G, and B component values of the first pixel are respectively stored in rgb[0], rgb[1], and rgb[2].

After the color mode converter 111 completes the YUV-to-RGB conversion of the first pixel, step 423 is carried out. At step 423, in order to accomplish a YUV-to-RGB conversion of a next pixel, the CPU 105 increases the value of "j" by one and steps 417 to 423 are repeated. After all the YUV-to-RGB conversions to 176 pixels arranged in the horizontal direction are completed, the process is directed to step 425 from step 417. At step 425, in order to perform a YUV-to-RGB conversion of the first pixel in a next line, the CPU 105 increases the value of "i" by one and steps 411 to 425 are repeated. After the YUV-to-RGB conversions to all the pixels in 144 lines, i.e., all the pixels of one frame, are completed, the process is directed to step 413 from step 411. That is, the conversion of the color mode is terminated.

As above-described, the color model conversion method of the Y:U:V=4:4:4 format is described. Hereinafter, with reference to FIG. 5, a color model conversion method of the Y:U:V=4:2:0 format will be described in detail.

At step 407, when it is determined that the ratio of Y:U:V is 4:2:0, the CPU 105 carries out step 501. At step 501, the CPU 105 sets the value of "i" to be 0, and the process is directed to step 503. Similarly to FIG. 4, the character "i" is a variable for counting pixels arranged in the vertical direction per frame, and has values in the range of 0 to 144 in the QCIF mode. At step 503, the CPU 105 compares the value of "i" to 144. When the value of "i" is smaller than 144, the process is directed to step 505, and when the value of "i" is 144, the process is directed to step 517 and the color model conversion is terminated.

At step 505, the CPU 105 sets the value of "j" to be 0. Similarly to FIG. 4, the character "j" is a variable for counting pixels arranged in the horizontal direction per frame, and has values in the range of 0 to 176. At step 507, the CPU 105 compares the value of "j" to 176. When the value of "j" is smaller than 176, the process is directed to step 509.

Similarly to step 419, step 509 is a step for setting indexes in the RGB arrangement and the YUV arrangement. Step 509 is similar to step 419 in that an indexRGB being the index of the RGB arrangement is (j+i×176)×3 and an indexY being an index of the Y component value of the YUV arrangement is set to be j+i×176. However, in the Y:U:V= 4:2:0 format, an indexU is set to be (j>>1)+(i>>1)×88+176× 144, and an indexV is set to be indexU+176×144/4.

Figure 7:
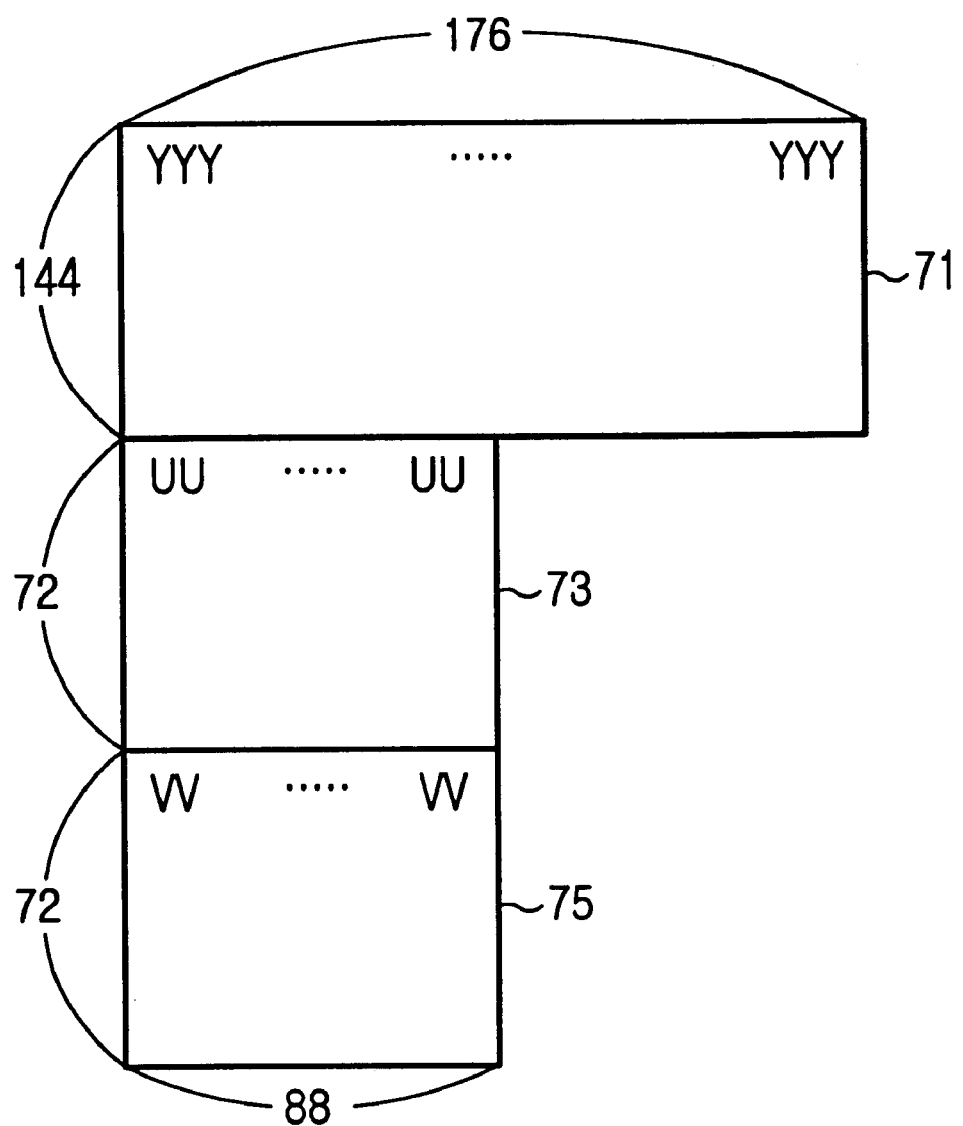
FIG. 7 shows a memory map for storing pixel data in accordance with another embodiment of the present invention.

FIG. 7 shows a memory map for storing the Y, U, and V component values in the Y:U:V=4:2:0 format. In the Y:U:V= 4:2:0 format in which the luminance component is more important than the chrominance components, the Y component value is determined by each pixel, but the U and V component values are determined by four pixels. Therefore, in order to store the U and V component values as shown in FIG. 7, only a quarter of the memory capacity for storing the Y component is required. In the indexU, the shift right operations of the values of "j" and "i" by one, i.e., j>>1 and i>>1, respectively means the division of the values of "j" and "i" by 2. Therefore, the indexU indicates an address of a region 73 of FIG. 7, and the indexV indicates an address of a region 75 of FIG. 7. Since the values of "i" and "j" are set to be 0, the indexY is 0, the indexU is 176×144, and the indexV is 176×144+176×144/4, thereby respectively representing the first addresses of the regions 71, 73, and 75 of FIG. 7. Further, the indexRGB represents the first address in the RGB arrangement.

Returning to FIG. 5, after the indexes are set in step 509 the process continues to step 511. At step 511, the CPU 105, which sets the indexes of respective arrangements at step 509, outputs values stored in respective addresses of the indexY, indexU, and indexV in the YUV arrangement to the color mode converter 111. At this time, similarly to step 421, the color mode converter 111 performs a YUV-to-RGB conversion. The obtained R, G, and B component values of the first pixel are respectively stored in rgb[0], rgb[1], and rgb[2].

After the YUV-to-RGB conversion of the first pixel is completed, step 513 is carried out. At step 513, in order to accomplish a YUV-to-RGB conversion of a next pixel, the CPU 105 increases the value of "j" by one and steps 507 to 511 are repeated. After all the YUV-to-RGB conversions to 176 pixels arranged in the horizontal direction are completed, the process is directed to step 515 from step 507. At step 515, in order to perform a YUV-to-RGB conversion of the first pixel in a next line, the CPU 105 increases the value of "i" by one and steps 503 to 515 are repeated. After the YUV-to-RGB conversions to all the pixels in 144 lines, i.e., all the pixels of one frame, are completed, the process is directed to step 517 from step 503. That is, the conversion of the color mode is terminated.

Figure 8A:
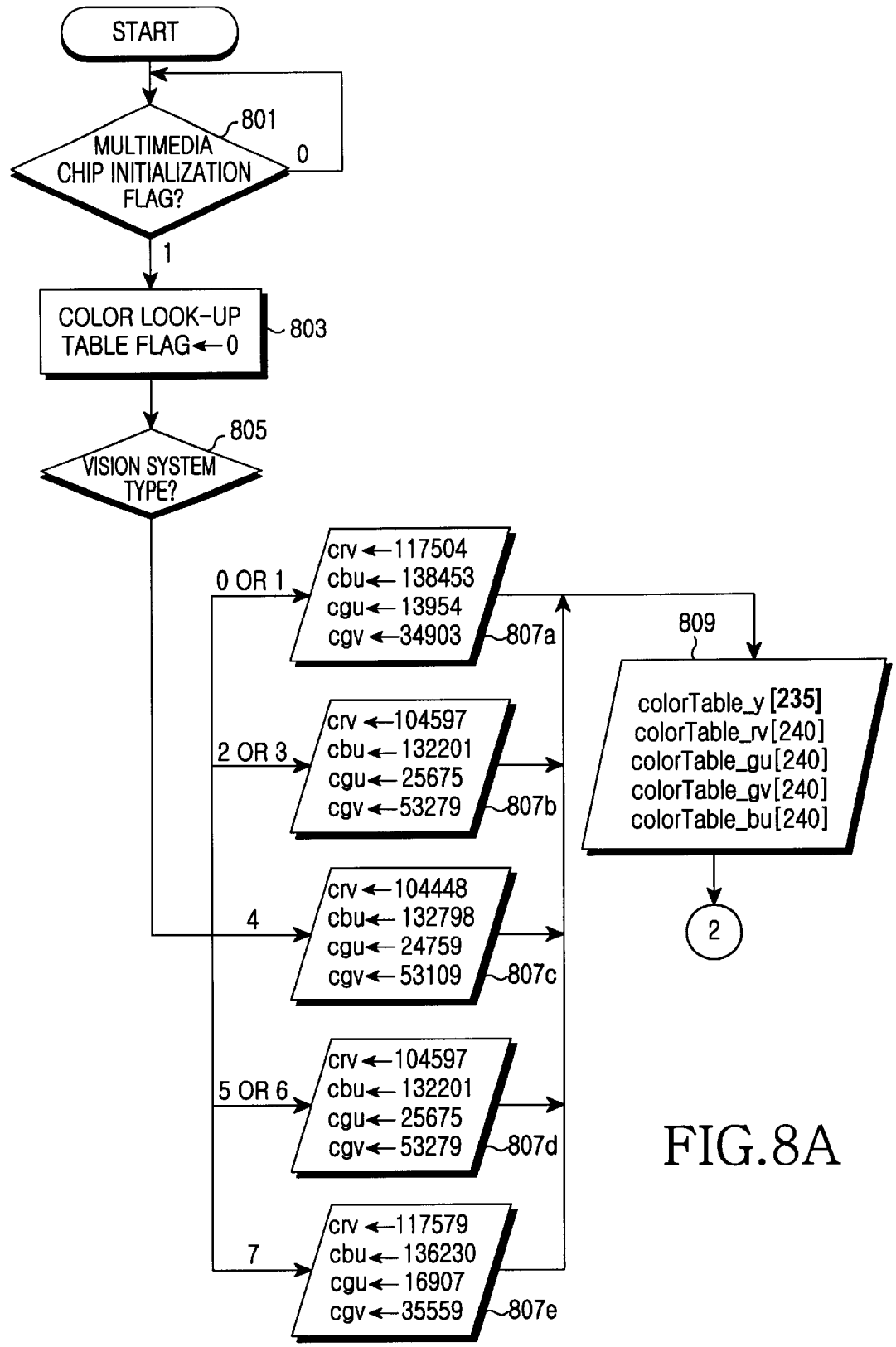
FIGS. 8A and 8B is a block diagram of a process for generating color look-up tables in accordance with an embodiment of the present invention.
Figure 8B:
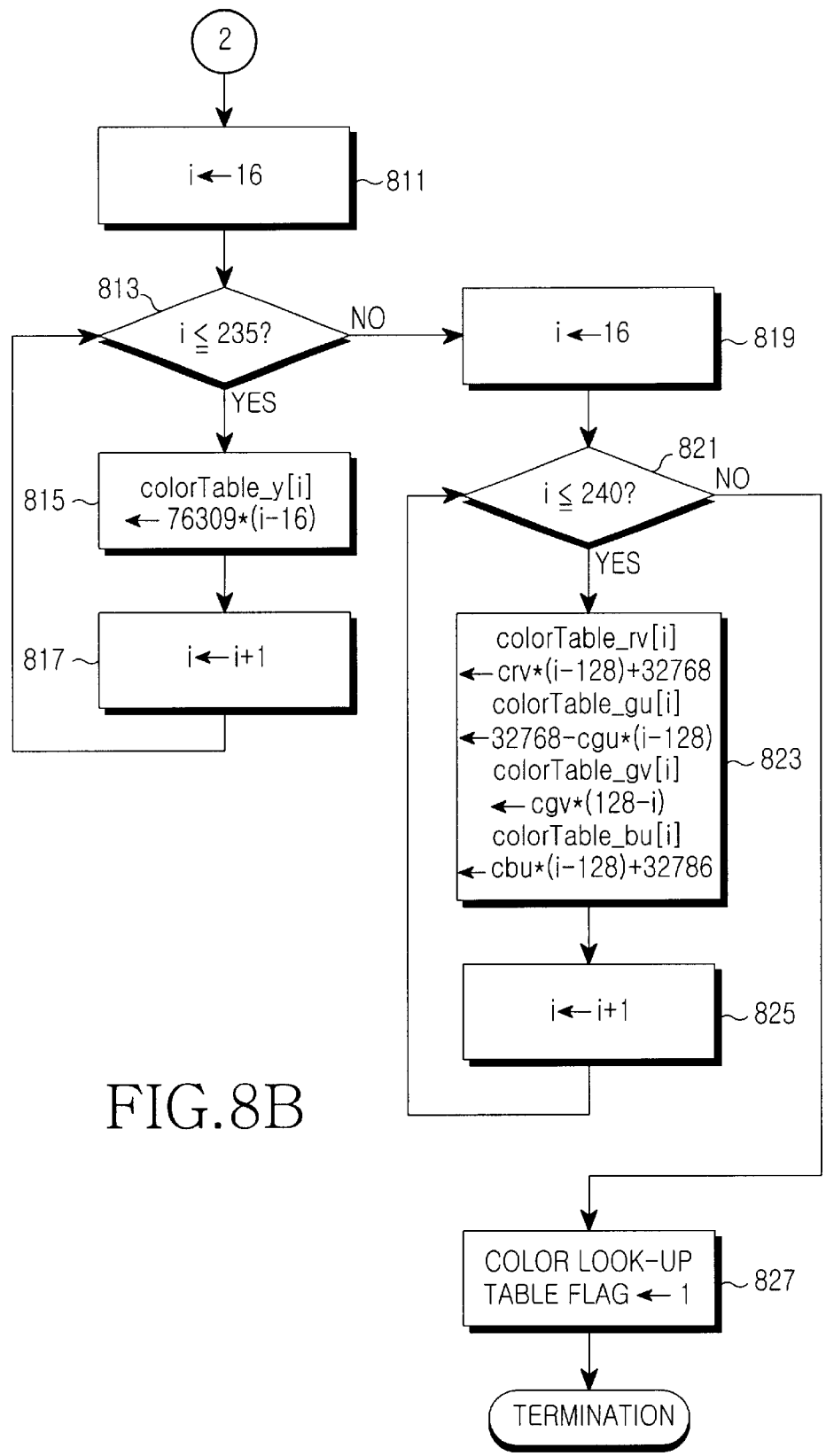

Hereinafter, with reference to FIG. 8A and B, a process for generating the color look-up tables for color model conversion is described in detail.

When the multimedia device is initiated, the color look-up table generator 109 is directed to the routine for generating the color look-up tables under the control of the CPU 105 (step 801). However, as described above, the color look-up tables are also generated when the color model conversion is required by the video CODEC 205 or the camera driving device 103. If the generation of the color look-up tables is not required in step 801, the process returns to START. When the generation of the color look-up tables is required, at step 803 the color look-up table generator 109 sets the color look-up table flag to be 0. Then, the process is directed to step 805. At step 805, the color look-up table generator 109 tests a vision system type set in a configuration file of the multimedia device.

As stated in Table 1, the statistical weight values of the Y, U, and V components are differently defined by International Standard Organizations. The use differently defined statistical weight values by the ISOs depends on the LCD devices of the multimedia system, i.e., vision systems. Therefore, when different vision systems are used, the statistical weight values are differently used. Thus, different color look-up tables must be generated. Table 2 defines vision system types according to the ISOs. In accordance with Table 2, the configuration file of the multimedia device comprises data of the ISO, which the LCD follows.

TABLE 2

| Vision System Type | International Standard Organization (ISO) |
|---|---|
| 0 | No sequence display extension |
| 1 | ITU-R Rec. 709(1990) |
| 2 | Unspecified |
| 3 | Reserved |
| 4 | FCC |
| 5 | ITU-R Rec.624-4 System B, G |
| 6 | SMPTE 170M |
| 7 | SMPTE 240M(1987) |

According to the vision system type tested at step 805, the color look-up table generator 109 sets the statistical weight values of the color look-up tables 303, 305, 307, and 309 to be respectively designated constants. These constants are predetermined by each tested vision system type. Herein, crv is a statistical weight value used in the color look-up table colorTable_rv 303, cgu is a statistical weight value used in the color look-up table colorTable_gu 305, cgv is a statistical weight value used in the color look-up table colorTable_gv 307, and cbu is a statistical weight value used in the color look-up table colorTable_bu 309. Depending on the vision system type, the crv, cbu, cgu and cgv values are set in one of steps 807a-807e.

At step 809, the color look-up table generator 109 assigns designated regions for storing the color look-up tables on the memory 107. Herein, the color look-up table generator 109 tests the color mode supported by the LCD device 113 and prepares regions for storing an arrangement with bit number corresponding to the tested mode, i.e., bit-depth, on the memory 107. For example, in case the LCD device 113 supports a 24 bit-true color mode, an arrangement region of 24 bits or 32 bits is prepared, and in case the LCD device 113 supports only a 16 bit-color mode or 8 bit-color mode, an arrangement region of 16 bits or 8 bits is prepared.

At step 811, the color look-up table generator 109 sets the value of "i" to be 16. The variable "i" is a variable for counting the Y component values in the designated range of 16 to 235. When the value of "i" is less than 235 at step 813, a calculated value of 76309×(i−16) is stored in an i'th address of the color look-up table y 301 at step 815. The value of "i" is increased by one at step 817, and steps 813 to 817 are repeated until and including when the value of "i" is 235. When the value of "i" is greater than 235 at step 813, the generation of the color look-up table colorTable_y 301 is completed and the process is directed to step 819.

At step 819, the value of "i" is again set to be 16. Steps 821 to 825 are repeated until the value of "i" is greater than 240, thereby generating the color look-up tables 303, 305, 307, and 309. When the value of "i" is greater than 240 at step 821, the color look-up table generator 109 carries out step 827, thereby setting the color look-up table flag to be 1 and terminating the program for generating the color look-up tables.

As apparent from the above description, the present invention allows one color look-up table to be applied to one variable, commonly uses parts of color look-up tables in obtaining the R, G, and B component values, and employs statistical weight values in the form of integers which are multiplied by the variables so as to generate the color look-up tables, thereby converting the color mode with the minimum memory capacity and the minimum instructions.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. For example, the color look-up table generator 109 and the color mode converter 111 may store only programs for generating color look-up tables and converting the color mode, and the CPU 105 may operate these programs. Further, although the preferred embodiment of the present invention applies Equation 2, any other equations with other statistical weight values in the form of integers may be applied. Therefore, the scope and spirit of the present invention is not limited by the preferred embodiments but is limited by the accompanying claims and their equivalences.

What is claimed is:

1. A method for converting pixels from a YUV format, including a Y component representing luminance and U and V components representing chrominance, to a RGB format, including R, G, and B components respectively representing red, green, and blue colors, using color look-up tables, in order to display images on a video display device, said method comprising the steps of:

generating pixels in the YUV format including the Y, U, and V components from encoded video signals;

inputting a Y component value of the generated pixel to a first color look-up table, storing first values corresponding to all the Y component values in a designated range in the first color look-up table, and outputting a value selected from the first values stored in the first color look-up table corresponding to the inputted Y component value as partial values of the R, G, and B components to first, second and third adders, respectively;

inputting a V component value of the generated pixel to second and third color look-up tables, storing second and third values respectively corresponding to all the V component values in a designated range in the second and third color look-up tables, and outputting a value selected from each of the second values stored in the second color look-up table and the third values stored in the third color look-up table corresponding to the inputted V component value as partial values of the R and G components to the first and second adders, respectively;

inputting a U component value of the generated pixel to fourth and fifth color look-up tables, storing fourth and fifth values respectively corresponding to all the U component values in a designated range in the fourth and fifth color look-up tables, and outputting a value selected from each of the fourth values stored in the fourth color look-up table and the fifth values stored in the fifth color look-up table corresponding to the inputted U component value as partial values of the G and B components to the second and third adders, respectively; and outputting R, G, and B component values from the first, second, and third adders, respectively.

2. The method as set forth in claim 1, wherein the first values are calculated values of 76309*(Y−16) for all the Y component values in the designated range, the second values are calculated values of crv*(V−128)+32768 for all the V component values in the designated range, the third values are calculated values of cgv*(128−V) for all the V component values in the designated range, the fourth values are calculated values of 32768−cgu*(U−128) for all the U component values in the designated range, and the fifth values are calculated values of cbu*(U−128)+32768 for all the U component values in the designated range, and wherein crv is a statistical weight value for the V component of the R component, cgv is a statistical weight value for the V component of the G component, cgu is a statistical weight value for the U component of the G component, and cbu is a statistical weight value for the U component of the B component.

3. The method as set forth in claim 2, wherein crv, cgv, cgu, and cbu are selected from a plurality of groups consisting of statistical weight values according to the video display device.

4. The method as set forth in claim 1, wherein the Y component is a luminance component, the V component is a Red-chrominance component, the U component is a Blue-chrominance component, the R component is a red component, the G component is a green component, and the B component is a blue component.

5. The method as set forth in claim 1, wherein, the R component value is obtained from the added value of the partial values outputted from the first and second color look-up tables using the first adder, the G component value is obtained from the added value of the partial values outputted from the first, third, and fourth color look-up tables using the second adder, and the B component value is obtained from the added value of the partial values outputted from the first and fifth color look-up tables using the third adder.

6. The method as set forth in claim 5, further comprising the step of shift-operating the values outputted from the adders using a shift operator to obtain the R, G, and B component values.

7. In a system for converting pixels from a YUV format, including a Y component representing luminance and U and V components representing chrominance, to a RGB format, including R, G, and B components respectively representing red, green, and blue colors, using color look-up tables, in order to display images on a video display device, a method for generating pixels in the YUV format including the Y, U, and V components from encoded video signals, obtaining the R component value from respective partial values of the Y and V components to the R component, obtaining the G component value from respective partial values of the Y, U, and V components to the G component, and obtaining the B component value from respective partial values of the Y and U components to the B component, said method comprising the steps of:

inputting a Y component value of the generated pixel to a first color look-up table, selecting the partial values of the Y component to the R, G, B components from the first color look-up table corresponding to the inputted Y component value, and respectively outputting the selected partial values to first, second, and third adders;

inputting a V component value of the generated pixel to second and third color look-up tables, respectively selecting the partial values of the V component to the R and G components from the second and third color look-up tables corresponding to the inputted V component value, and respectively outputting the selected partial values to the first and second adders;

inputting a U component value of the generated pixel to fourth and fifth color look-up tables, respectively selecting the partial values of the U component to the G and B component from the fourth and fifth color look-up tables corresponding to the inputted U component value, and respectively outputting the selected partial values to the second and third adders; and outputting R, G, and B component values from the first, second, and third adders, respectively.

8. An apparatus for receiving inputted pixels in a YUV format, including a Y component representing luminance and U and V components representing chrominance, and converting the pixels from the YUV format to a RGB format, including R, G, and B components respectively representing red, green, and blue colors, using color look-up tables, in order to display images on a video display device, said apparatus comprising:

a first color look-up table for storing first values corresponding to all Y component values in a designated range, and outputting a value selected from the stored first values corresponding to a Y component value of the inputted pixel as partial values of the R, G, and B components;

second and third color look-up tables for respectively storing second and third values corresponding to all V component values in a designated range, and respectively outputting a value selected from each of the second and third values corresponding to a V component value of the inputted pixel as partial values of the R and G components;

fourth and fifth color look-up tables for respectively storing fourth and fifth values corresponding to all U component values in a designated range, and respectively outputting a value selected from the each of the fourth and fifth values corresponding to a U component value of the inputted pixel as partial values of the G and B components; and adders for respectively adding the partial values outputted from the color look-up tables.

9. The apparatus as set forth in claim 8, wherein the adders comprise:

a first adder for adding the partial values outputted from the first and second color look-up tables and outputting the added values as a R component value;

a second adder for adding the partial values outputted from the first, and third and fourth color look-up tables and outputting the added values as a G component value; and a third adder for adding the partial values outputted from the first and fifth color look-up tables and outputting the added values as a B component value.

10. The apparatus as set forth in claim 9, wherein the apparatus further comprises a shift operator for shift-operating the values outputted from the first, second, and third adders.

11. The apparatus as set forth in claim 8, wherein the first values are calculated values of 76309*(Y−16) for all the Y component values in the designated range, the second values are calculated values of crv*(V−128)+32768 for all the V component values in the designated range, the third values are calculated values of cgv*(128−V) for all the V component values in the designated range, the fourth values are calculated values of 32768−cgu*(U−128) for all the U component values in the designated range, and the fifth values are calculated values of cbu*(U−128)+32768 for all the U component values in the designated range, and wherein crv is a statistical weight value for the V component of the R component, cgv is a statistical weight value for the V component of the G component, cgu is a statistical weight value for the U component of the G component, and cbu is a statistical weight value for the U component of the B component.

* * * * *